US011065811B2

(12) United States Patent
MacNeish, III et al.

(10) Patent No.: US 11,065,811 B2
(45) Date of Patent: Jul. 20, 2021

(54) THREE-DIMENSIONAL PRINTER HEAD INCLUDING AN AUTOMATIC TOUCHDOWN APPARATUS

(71) Applicant: Essentium Inc., Pflugerville, TX (US)

(72) Inventors: William J. MacNeish, III, Newport Beach, CA (US); Erik John Gjovik, Aliso Viejo, CA (US); Alexander Stockton, Austin, TX (US); Chad C. Eichele, Lake Forest, CA (US)

(73) Assignee: ESSENTIUM, INC., Pflugerville, TX (US)

( * ) Notice: Subject to any disclaimer, the term of this patent is extended or adjusted under 35 U.S.C. 154(b) by 11 days.

(21) Appl. No.: 16/359,671

(22) Filed: Mar. 20, 2019

(65) Prior Publication Data

US 2020/0298478 A1 Sep. 24, 2020

(51) Int. Cl.
*B29C 64/209* (2017.01)
*B29C 64/295* (2017.01)
(Continued)

(52) U.S. Cl.
CPC .......... *B29C 64/209* (2017.08); *B29C 64/227* (2017.08); *B29C 64/295* (2017.08);
(Continued)

(58) Field of Classification Search
CPC ... B29C 64/209; B29C 64/227; B29C 64/393; B29C 64/295; B33Y 50/02; B33Y 30/00
See application file for complete search history.

(56) References Cited

U.S. PATENT DOCUMENTS 2,875,311 A 2/1954 Harkenrider
2,808,623 A 10/1957 Foster
(Continued)

FOREIGN PATENT DOCUMENTS

CN 103350507 A 10/2013
CN 206367193 U 8/2017
(Continued)

OTHER PUBLICATIONS

Deloitte, 3D oppurtunity for quality assurance andparts qualification—Additive manufacturingclears the bar. Deloitte Nov. 18, 2015 Retrieved on Feb. 17, 2021 from https://www2.deloitte.com/us/en/insights/focus3d-opportunity/3d-printing-quality-assurance-in-manufacturing.html.

(Continued)

*Primary Examiner* — Nahida Sultana
(74) *Attorney, Agent, or Firm* — Vivacqua Crane

(57) ABSTRACT

A three-dimensional printer head includes a drive motor, the drive motor including a drive shaft, a feed plate is affixed to the drive motor, and a feed hob is mounted to the drive shaft. The feed hob includes drive teeth configured to engage a filament. An idle assembly mounted to the feed plate configured to bias the filament against the drive teeth. The printer head further includes a z-axis plate assembly, wherein the z-axis plate assembly includes at least two flexures coupling a z-axis plate to the feed plate and a print nozzle mounted to the z-axis plate assembly. The printer head also includes a sensor coupled to the feed plate, wherein the sensor is configured to be triggered by the z-axis plate assembly when the z-axis plate assembly moves a given distance in a first direction.

20 Claims, 13 Drawing Sheets

(51) Int. Cl.

| | |
|---|---|
| ***B33Y 30/00*** | (2015.01) |
| ***B33Y 50/02*** | (2015.01) |
| ***B29C 64/393*** | (2017.01) |
| ***B29C 64/227*** | (2017.01) |

(52) U.S. Cl.

CPC ............ *B29C 64/393* (2017.08); *B33Y 30/00* (2014.12); *B33Y 50/02* (2014.12)

(56) References Cited

U.S. PATENT DOCUMENTS

| | | | | |
|---|---|---|---|---|
| 3,055,053 | A | 9/1962 | Livingston | |
| 6,439,448 | B1 | 8/2002 | Ringler | |
| 8,236,227 | B2 | 8/2012 | Batchelder et al. | |
| 8,512,024 | B2 | 8/2013 | Pax | |
| 9,050,753 | B2 | 6/2015 | Rodgers et al. | |
| 9,073,263 | B2 | 7/2015 | Mannella et al. | |
| 9,321,608 | B2 | 4/2016 | Beery et al. | |
| 9,327,452 | B2 | 5/2016 | Mark et al. | |
| 9,339,975 | B2 | 5/2016 | Molinari et al. | |
| 9,345,070 | B2 | 5/2016 | Long et al. | |
| 9,764,514 | B2 * | 9/2017 | Albert | B29C 64/118 |
| 10,073,424 | B2 | 9/2018 | Lin | |
| 10,150,249 | B2 | 12/2018 | Ryan et al. | |
| 10,343,349 | B2 | 7/2019 | Korn | |
| 10,513,103 | B2 | 12/2019 | Leavitt et al. | |
| 10,688,588 | B2 | 6/2020 | Twelves, Jr. et al. | |
| 2012/0018924 | A1 | 1/2012 | Swanson et al. | |
| 2013/0209739 | A1 | 8/2013 | Fruth | |
| 2014/0287139 | A1 | 9/2014 | Farmer et al. | |
| 2014/0328963 | A1 * | 11/2014 | Mark | B29C 64/209 425/143 |
| 2015/0183164 | A1 | 7/2015 | Duty et al. | |
| 2015/0298393 | A1 | 10/2015 | Suarez | |
| 2016/0031159 | A1 | 2/2016 | Church et al. | |
| 2016/0067920 | A1 * | 3/2016 | Fontaine | B29C 64/106 264/255 |
| 2016/0082641 | A1 | 3/2016 | Bogucki et al. | |
| 2016/0151833 | A1 | 6/2016 | Tsao | |
| 2016/0318246 | A1 | 11/2016 | Rios et al. | |
| 2016/0318260 | A1 * | 11/2016 | Hyde | B33Y 10/00 |
| 2017/0057171 | A1 * | 3/2017 | Chang | B29C 64/106 |
| 2017/0151606 | A1 | 6/2017 | Koga et al. | |
| 2017/0190109 | A1 | 7/2017 | Holland et al. | |
| 2017/0266885 | A1 * | 9/2017 | Gifford | B29C 64/321 |
| 2017/0312849 | A1 | 11/2017 | Yang et al. | |
| 2017/0326773 | A1 | 11/2017 | Gibson | |
| 2018/0065304 | A1 * | 3/2018 | Stockett | B29C 64/393 |
| 2018/0099453 | A1 * | 4/2018 | Cambron | B29C 64/236 |
| 2018/0154586 | A1 | 6/2018 | Wang et al. | |
| 2018/0186094 | A1 * | 7/2018 | Yang | B33Y 99/00 |
| 2019/0030817 | A1 * | 1/2019 | Ciscon | B29C 64/112 |
| 2019/0047225 | A1 | 2/2019 | Luo | |
| 2019/0099946 | A1 | 4/2019 | MacNeish, et al. | |
| 2019/0202121 | A1 * | 7/2019 | Budge | B29C 64/255 |
| 2020/0269506 | A1 * | 8/2020 | Macmullen | B29C 64/393 |
| 2020/0290277 | A1 * | 9/2020 | Fujii | B29C 64/307 |
| 2020/0338831 | A1 * | 10/2020 | Watanabe | B29C 64/386 |
| 2020/0376744 | A1 * | 12/2020 | Watanabe | B29C 64/209 |
| 2020/0376771 | A1 * | 12/2020 | Maeda | B33Y 50/02 |
| 2020/0406547 | A1 * | 12/2020 | Yuwaki | B29C 64/245 |

FOREIGN PATENT DOCUMENTS

| | | | |
|---|---|---|---|
| CN | 206425551 | U | 8/2017 |
| DE | 102015016455 | A1 | 6/2017 |
| FR | 3022826 | A1 | 1/2016 |
| KR | 20160120538 | A | 10/2016 |
| WO | 2016102669 | A1 | 6/2016 |
| WO | 2017088754 | A1 | 6/2017 |
| WO | 2018026909 | A1 | 2/2018 |
| WO | 2018194656 | A1 | 10/2018 |
| WO | 2020131808 | A1 | 6/2020 |
| WO | 2020131818 | A1 | 6/2020 |
| WO | 2020131867 | A1 | 6/2020 |
| WO | 2020131919 | A1 | 6/2020 |
| WO | 2020131943 | A1 | 6/2020 |
| WO | 2020132052 | A1 | 6/2020 |
| WO | 2020132119 | A1 | 6/2020 |
| WO | 2020132154 | A1 | 6/2020 |
| WO | 2020132167 | A1 | 6/2020 |
| WO | 2020132209 | A1 | 6/2020 |
| WO | 2020132283 | A1 | 6/2020 |
| WO | 2020132300 | A1 | 6/2020 |
| WO | 20200131830 | A1 | 6/2020 |

OTHER PUBLICATIONS

Quality Magazine, Closed-Loop Control, Quality Magazine Apr. 1, 2016 Retrieved on Feb. 17, 2021 from https://www.qualitymag.com/articles/93217-closed-loop-control.

Stratonics, Temperature Sensors for AdditiveManufacturing—Systems. Stratonics Nov. 2, 2016 Retrieved on Feb. 17, 2021 from https://web.archive.org/web/20161102135225/http://stratonics.com/systems/.

* cited by examiner

THREE-DIMENSIONAL PRINTER HEAD INCLUDING AN AUTOMATIC TOUCHDOWN APPARATUS

FIELD

The present disclosure is directed to a printer head including an automatic touchdown apparatus for a three-dimensional (3D) printer.

BACKGROUND

The statements in this section merely provide background information related to the present disclosure and may or may not constitute prior art.

Three-dimensional printers form three dimensional objects from computer generated models. In some instances, the printers deposit a feed stock in an additive manufacturing process. The feed stock may be deposited utilizing a printer head, which heats and deposits the feedstock, such as a thermoplastic filament. The printer head may move in a three-dimensional path to form the object. For example, the printer head may deposit the feedstock in a first layer and then, either the printer head, or the support table, may be moved to form successive layers. This process may then be repeated until the object is completed.

A number of challenges arise in the printing of objects using three-dimensional printers. One challenge in the printing process is the alignment of the printer head relative to the support table. Such alignment includes, for example, locating the printer head relative to the support table and leveling of the support table relative to the printer head. Another challenge is the monitoring of the feedstock material and the detection of any irregularities in the material as it is being deposited or after deposition.

Thus, while current 3D printer heads achieve their intended purpose, there is a need for a new and improved 3D printer heads and methods for receiving and dispensing 3D filament materials to build 3D structures. The new and improved 3D printer head, various monitoring features, and methods for automatically locating the printer head relative to the support table and measuring various properties to provide 3D objects of relatively higher quality.

SUMMARY

According to several aspects, a three-dimensional printer head is provided. The three-dimensional printer head includes a drive motor, the drive motor further including a drive shaft. The printer head further including a feed plate affixed to the drive motor, a feed hob mounted to the drive shaft, wherein the feed hob includes drive teeth configured to engage a filament, and an idle assembly mounted to the feed plate configured to bias the filament against the drive teeth. The printer head yet further includes a z-axis plate assembly, wherein the z-axis plate assembly includes at least two flexures coupling a z-axis plate to the feed plate and a print nozzle mounted to the z-axis plate assembly. The printer head also includes a sensor coupled to the feed plate, wherein the sensor is configured to be triggered by the z-axis plate assembly when the z-axis plate assembly moves a given distance in a first direction.

In another aspect of the present disclosure, the print nozzle includes a barrel, a heater coil wrapped around the barrel, insulation covering the heater coil, and a nozzle clamp coupling the barrel to the z-axis plate assembly.

In another aspect of the present disclosure, the z-axis plate defines an opening framed by opening first and second vertical side walls and first and second horizontal side walls, wherein the second horizontal side wall defines a recess for receiving the print nozzle.

In another aspect of the present disclosure, the flexures are coupled to the z-axis plate or the feed plate with blocks, wherein the flexures are positioned between the blocks and the z-axis plate or feed plate, and mechanical fasteners affix the blocks to the z-axis plate and or feed plate.

In another aspect of the present disclosure, the feed plate includes a ledge and the second horizontal side wall includes a first travel limit stop, configured to impinge on the ledge when the z-plate axis assembly moves up a given distance.

In an additional aspect of the present disclosure, the three-dimensional printer head includes a cross-bar coupled to the feed plate, extending into the opening of the z-axis plate.

In another aspect of the present disclosure, the z-axis plate assembly includes a second travel limit stop configured to impinge on the cross-bar when the z-plate axis assembly moves down a given distance.

In another aspect of the present disclosure, the feed hob includes drive teeth plates configured to engage a filament.

In another aspect of the present disclosure, the idle assembly including an idle hob configured to bias a filament against the feed hob.

In another aspect of the present disclosure, the idle hob is mounted on an idle arm body, which is mounted on a first eccentric cam that rotates around a pivot.

In another aspect of the present disclosure, the idle arm body is coupled to a leaf spring at a first end of the leaf spring and the leaf spring is biased at a second end of the leaf spring with a second eccentric cam.

In another aspect of the present disclosure, an adjustment knob is coupled to the second eccentric cam.

In an additional aspect of the present disclosure, the three-dimensional printer head includes a receiver connected to the feed plate, wherein the receiver includes a pathway configured to guide the filament between the feed hob and the idle assembly.

In another aspect of the present disclosure, a wire retainer is mounted to the z-axis plate assembly.

In an additional aspect of the present disclosure, the three-dimensional printer head includes a second sensor mounted to the feed plate or z-axis plate and configured to provide electrical signals to a control system indicating the location of the z-axis plate relative to the feed plate.

In an additional aspect of the present disclosure, the three-dimensional printer head includes a third sensor mounted to the cross-bar and configured to provide electrical signals to a control system indicating the force of the z-axis plate on the cross-bar.

According to several aspects, a method of locating a printer head relative to a support table is provided. The method includes raising a support table relative to a printer head as described above at a first speed and triggering the sensor, wherein triggering of the sensor indicates to a control system that the support table has contacted the print nozzle.

In an additional aspect of the present disclosure, the method includes repeating raising the support table relative to the printer head at least once at a second speed that is less than the first speed and triggering the sensor.

In an additional aspect of the present disclosure the printer head is located at a first x,y location relative to the support table and the method further includes moving the printer head to a second x,y location relative to the support table and repeating the steps of raising the support table relative to the printer head at a first speed for the second x,y location and triggering the sensor and moving the printer head to a third x,y location relative to the support table and repeating the steps of raising the support table relative to the printer head at a first speed for the third x,y location and triggering the sensor.

In another aspect, the method further includes repeating raising the support table relative to the printer head at each x,y location at least once at a second speed that is less than the first speed for each x,y location and triggering the sensor.

Further areas of applicability will become apparent from the description provided herein. It should be understood that the description and specific examples are intended for purposes of illustration only and are not intended to limit the scope of the present disclosure.

BRIEF DESCRIPTION OF DRAWINGS

The drawings described herein are for illustration purposes only and are not intended to limit the scope of the present disclosure in any way.

Figure 4A:
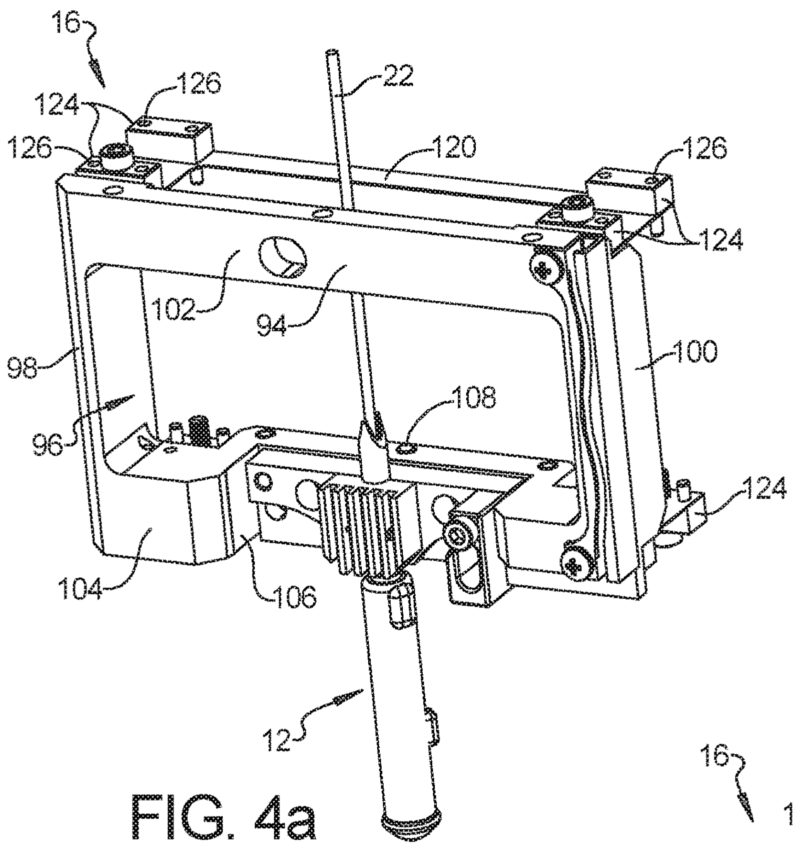

FIG. **4*a*** is a perspective view of an aspect of a z-axis plate assembly and print nozzle of the present disclosure;

FIG. **4*b* is a back perspective view of a z-axis plate assembly and print nozzle of FIG. 4*a*;**

Figure 4B:
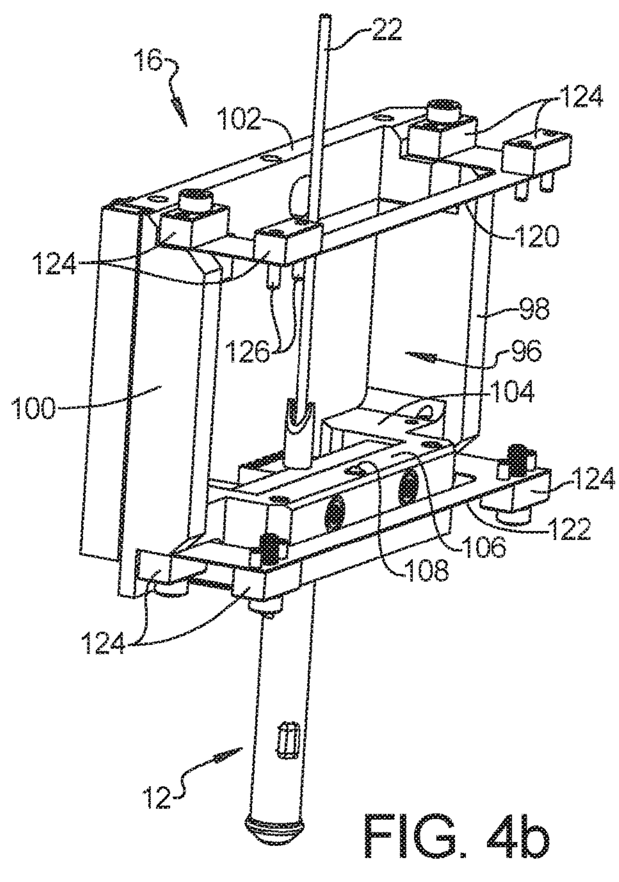
Figure 4C:
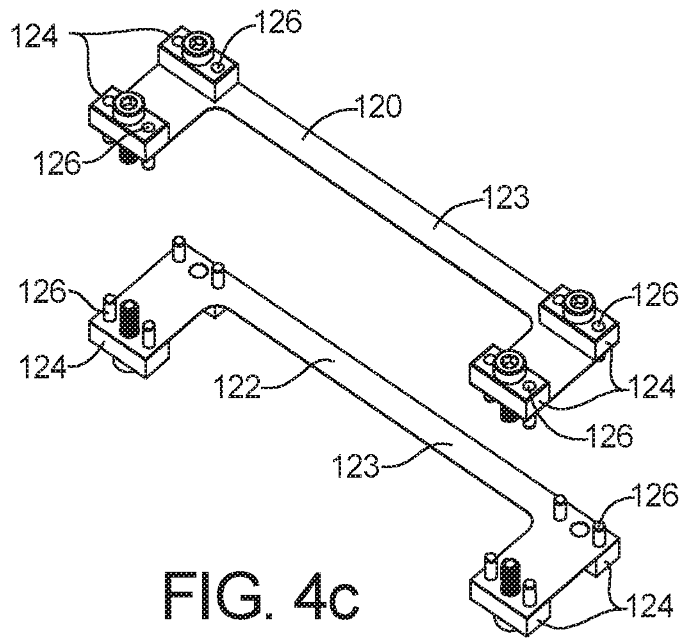

FIG. **4*c* is a top perspective view of the flexures of the z-axis plate assembly of FIGS. 4*a* and 4*b*;**

Figure 1:
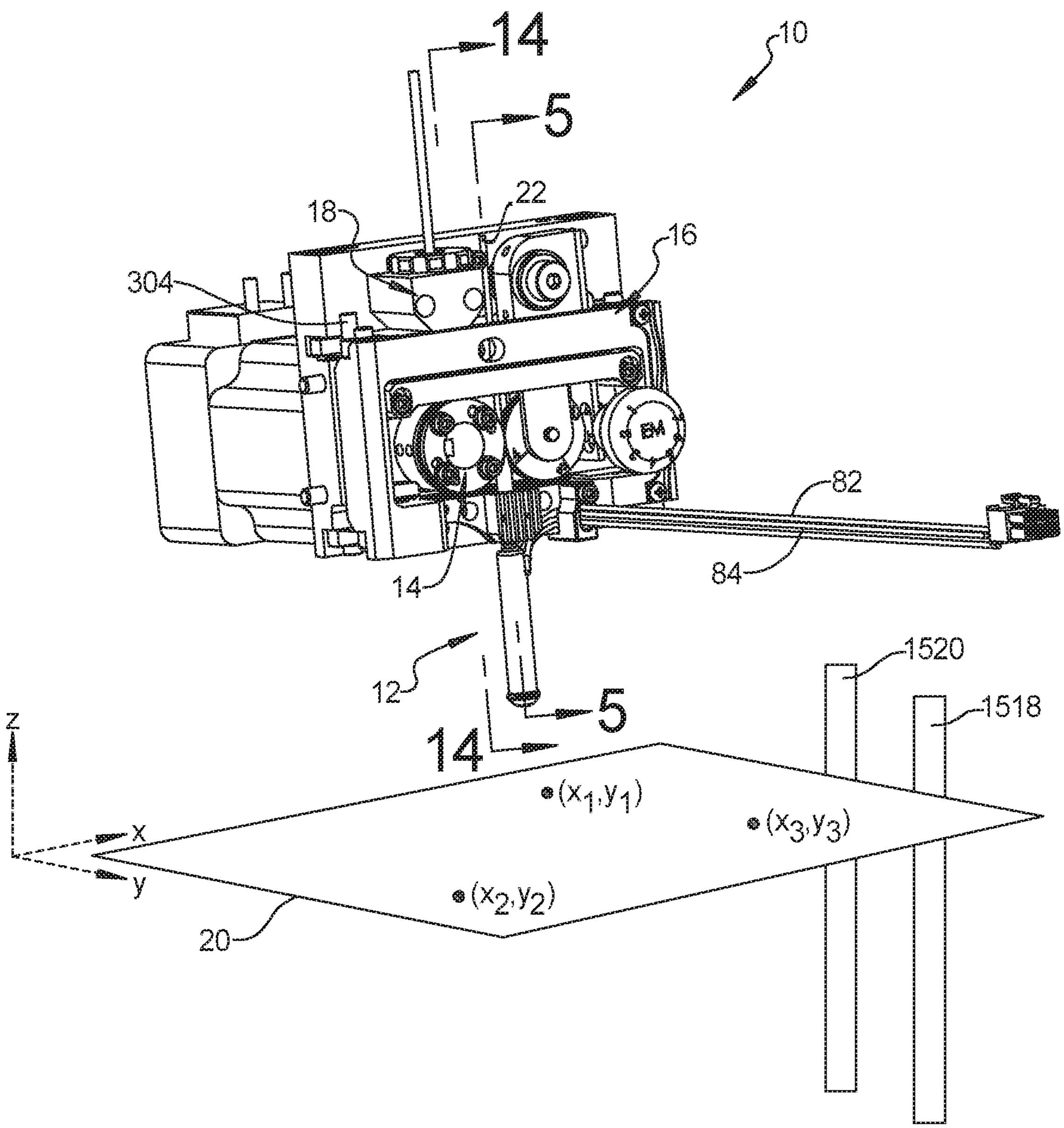
FIG. 1 a perspective view of an aspect of a three-dimensional printer head and support table of the present disclosure.
Figure 5:
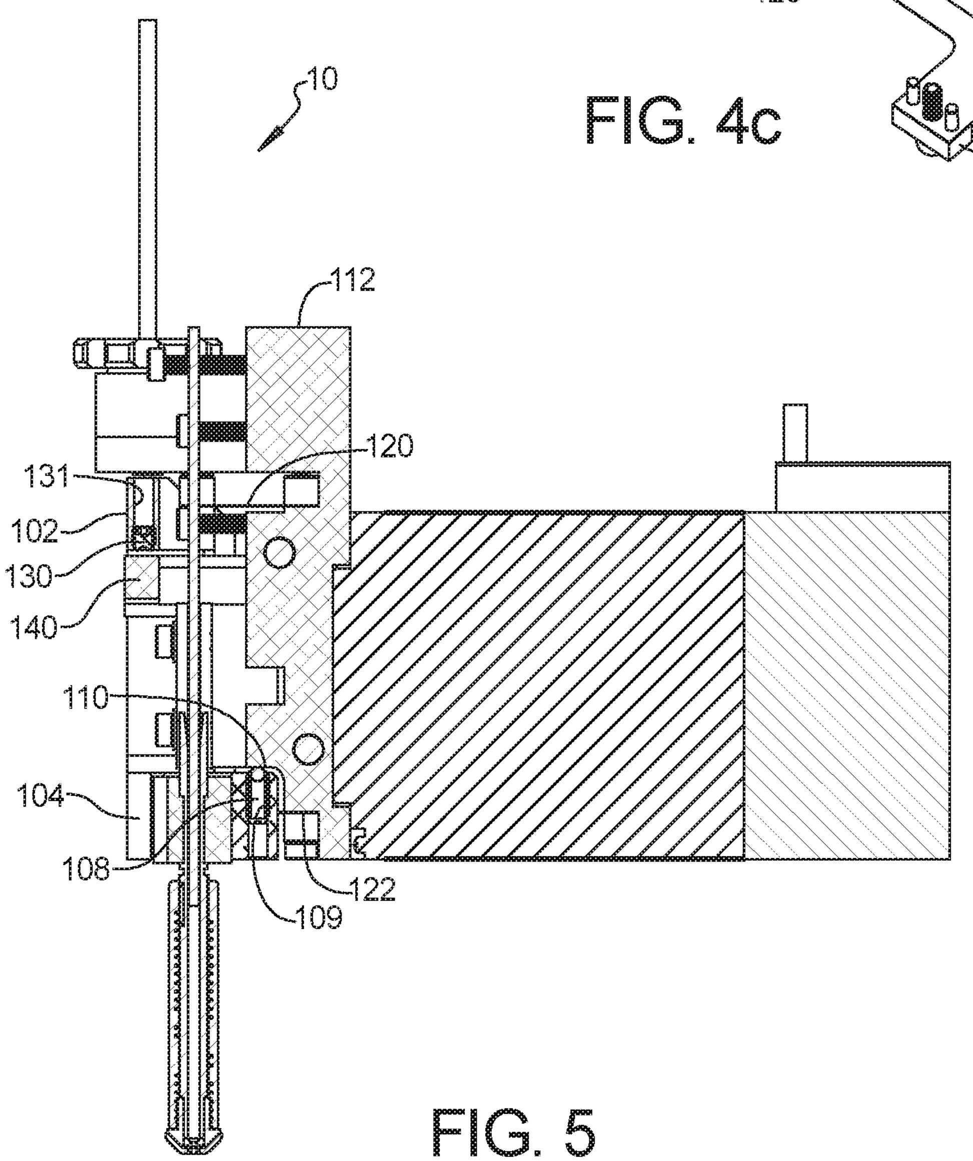
Figure 6:
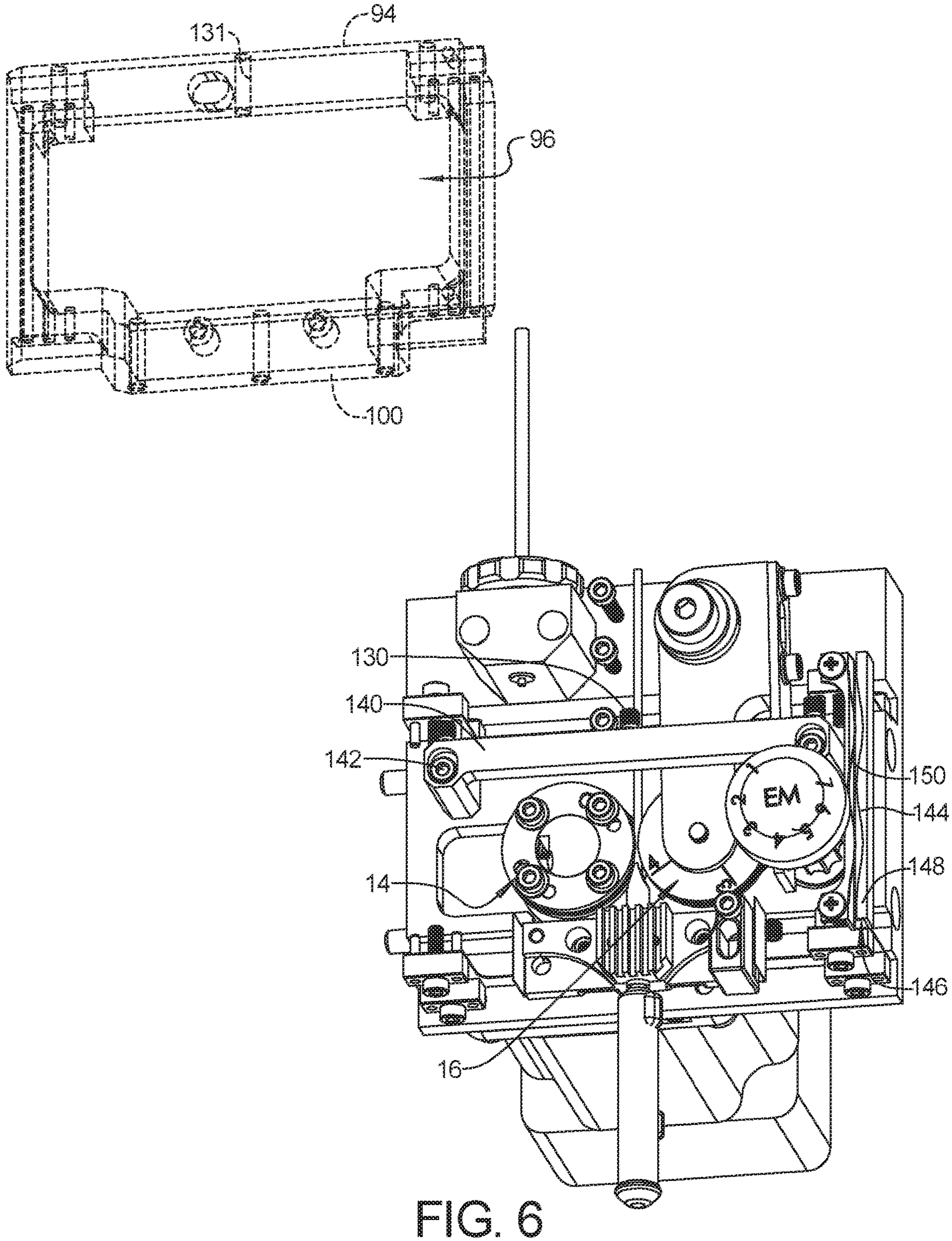
Figure 8A:
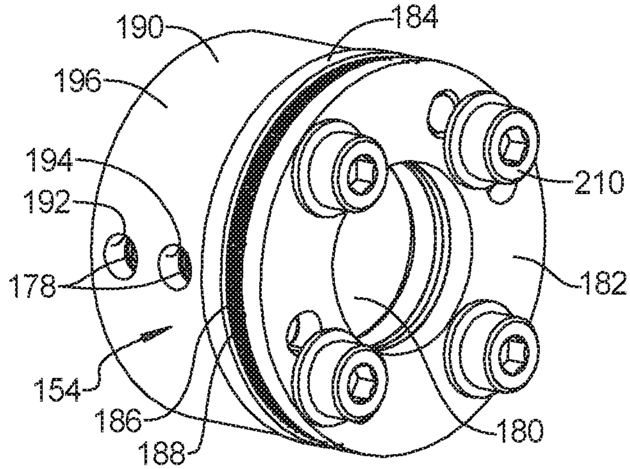
Figure 8B:
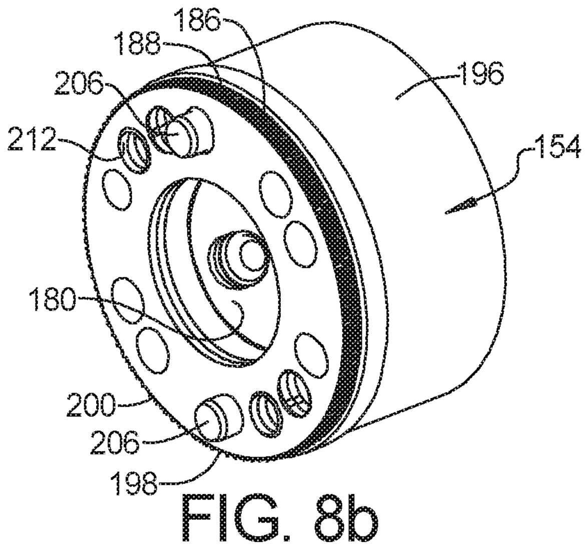

FIG. 5 is a cross-sectional view of a printer head of FIG. 1;

FIG. 6 is a front, perspective, partially exploded view of an aspect of the z-axis plate assembly and feed system of FIG. 1;

FIG. **7*a*** is a side, perspective view of a portion of the feed system including an aspect of the drive motor, feed plate and feed hob;

FIG. **7*b*** is a side, perspective view of a portion of the feed system including an aspect of the drive motor, feed plate, idle assembly and receiver;

FIG. **8*a*** is a side, perspective view of an aspect of the feed hob of the present disclosure;

FIG. **8*b* is a side, perspective view of the feed hob of FIG. 8*a*** without the face plate;

FIG. **8*c* is a cross-sectional view of the feed hob of FIG. 8*b*;**

Figure 9A:
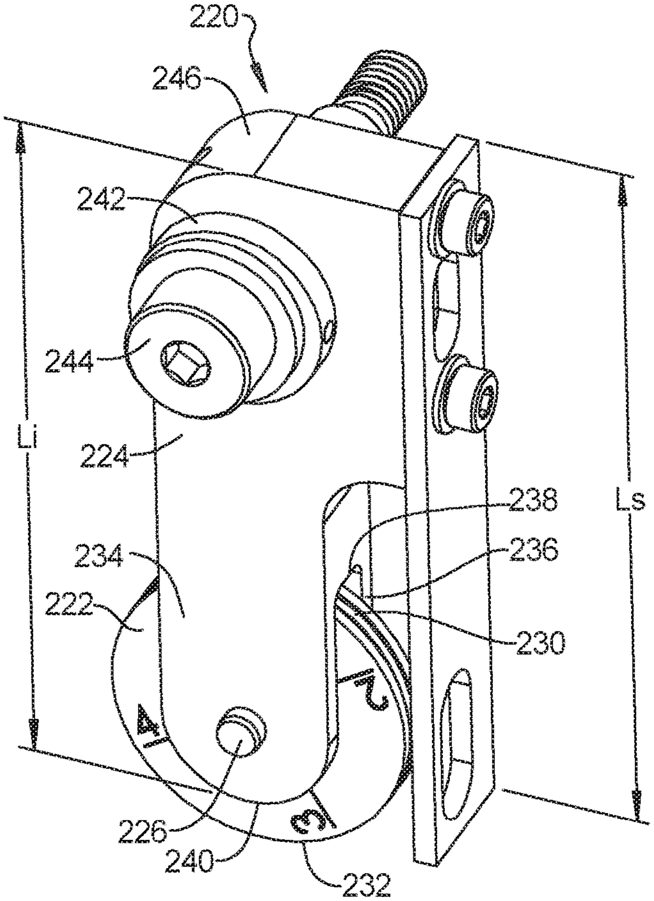

FIG. **9*a*** is a front, perspective view of an aspect of the idle assembly of the present disclosure;

FIG. **9*b* is a cross-section of the idle assembly of FIG. 9*a*;**

Figure 10:
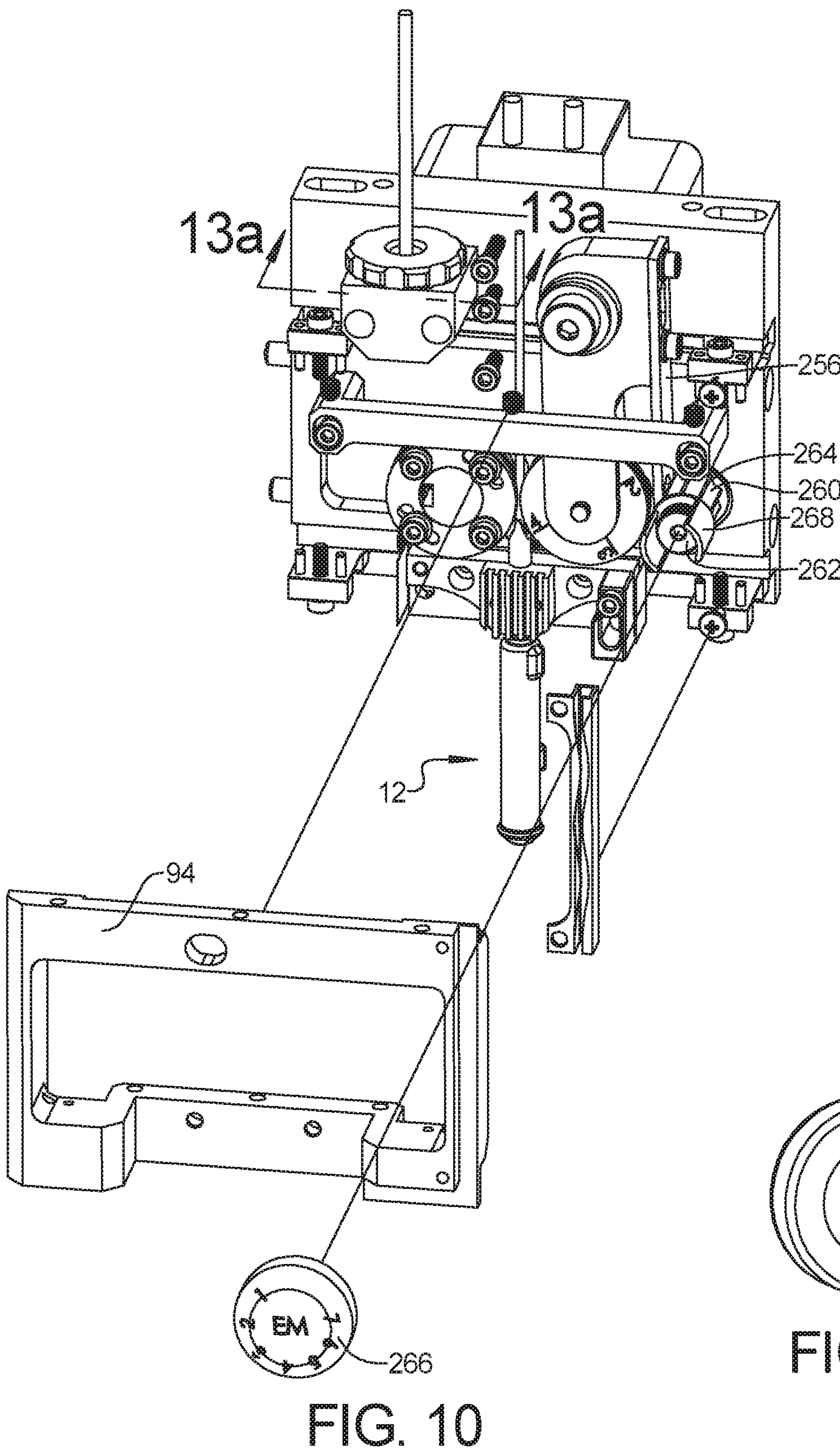
Figure 11:
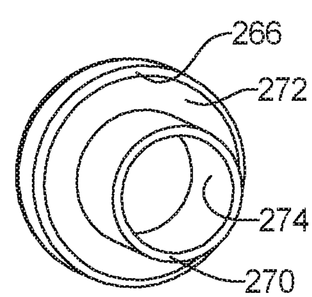
Figure 12A:
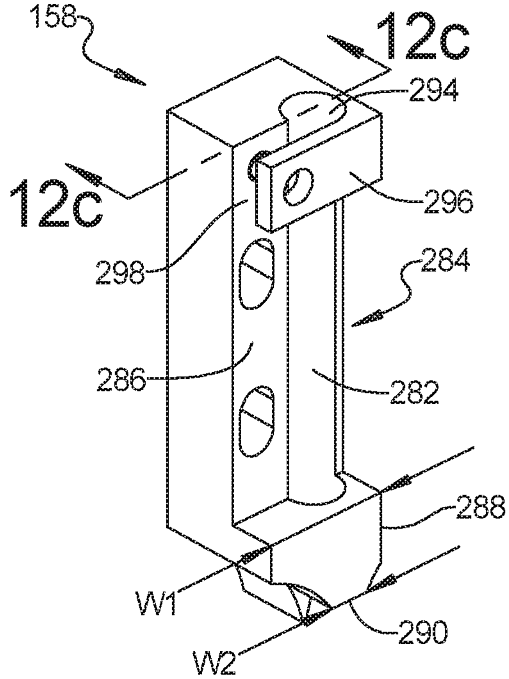

FIG. 10 is a front, partially exploded, perspective view of an aspect of the printer head of the present disclosure illustrating the cross-bar and idle assembly adjustment knob;

FIG. 11 is a rear view of an aspect of the adjustment knob of the idle assembly of the present disclosure;

FIG. **12*a*** is an aspect of the top perspective view of a receiver of the present disclosure;

FIG. **12*b* is a bottom perspective view of a receiver of FIG. 12*a*;**

Figure 12B:
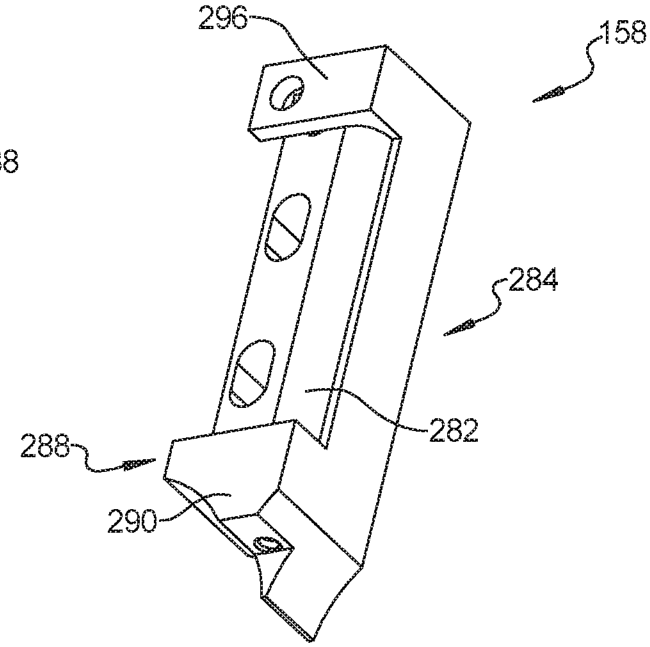

FIG. **12*c* is a cross-sectional view of the receiver of FIGS. 12*a* and 12*b*;**

Figure 13A:
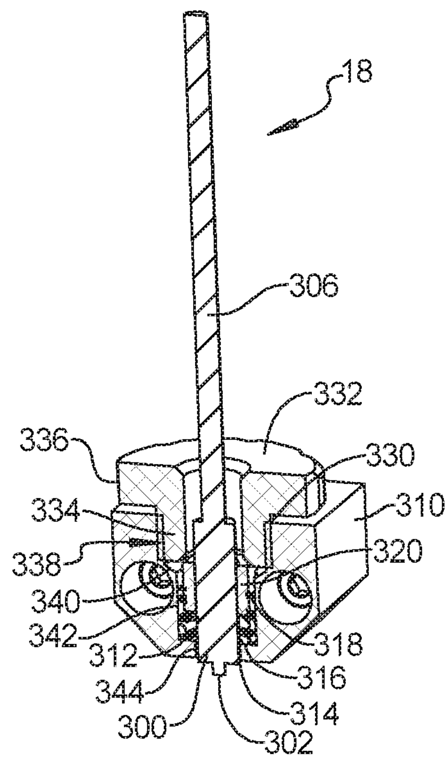

FIG. **13*a*** illustrates a cross-sectional view of an aspect of the sensor assembly of the present disclosure;

FIG. **13*b* illustrates an exploded view of the sensor assembly of FIG. 13*a*;**

Figure 14:
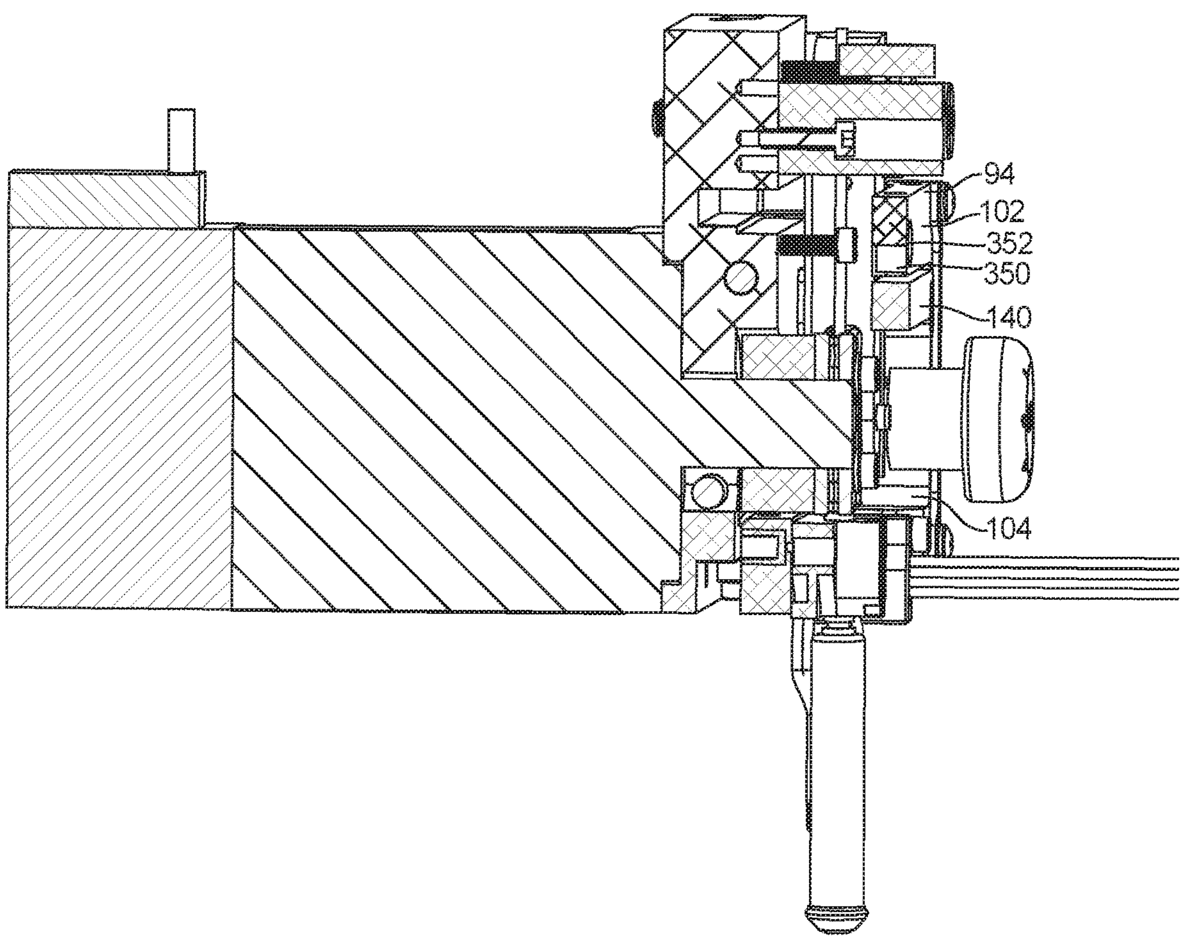
Figure 15:
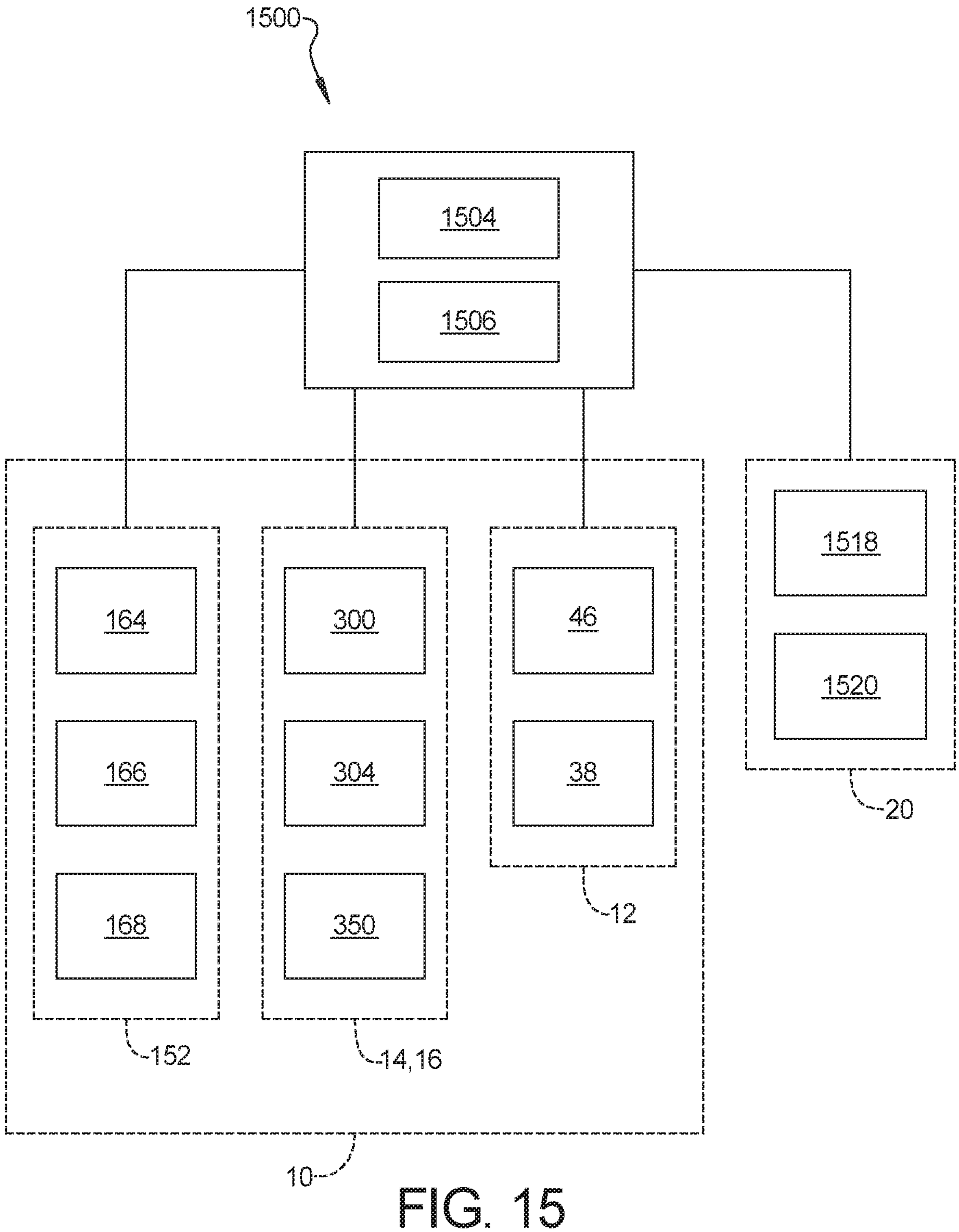

FIG. 14 is a cross-sectional view of the printer head of FIG. 1 illustrating an aspect of placement of a force sensor of the present disclosure; and FIG. 15 illustrates a schematic diagram of an aspect of a control system for the printer head of the present disclosure.

DETAILED DESCRIPTION

The following description is merely exemplary in nature and is not intended to limit the present disclosure, application, or uses.

The present disclosure is directed to a printer head including an automatic touchdown apparatus for a three-dimensional (3D) printer. As illustrated in FIG. 1, the three-dimensional printer head 10 generally includes a print nozzle 12. The printer head 10 also includes a feed system 14 for feeding filament 22 into the print nozzle 12. In aspects, the filament 22 includes thermoplastic materials, or materials that are at least partially thermoplastic, such as thermoplastic copolymers that may include cross-linked co-polymers. Non-limiting examples of filament materials include polyester, polyether ether ketone, polyethylene, thermoplastic elastomers, etc. In addition, the materials may include various modifiers that may alter the mechanical, chemical or visco-elastic properties of the material. The print nozzle 12 is mounted to a z-axis plate assembly 16, which allows the print nozzle to move in the z-axis, up and down relative to the support table independently of the feed system 14, providing the automatic touchdown apparatus. Further, a sensor assembly 18 is provided, which allows for the location of the print nozzle 12 relative to the support table 20. Additional sensors may also be provided, which allow for additional measurements to measure the material and print quality.

Figure 2:
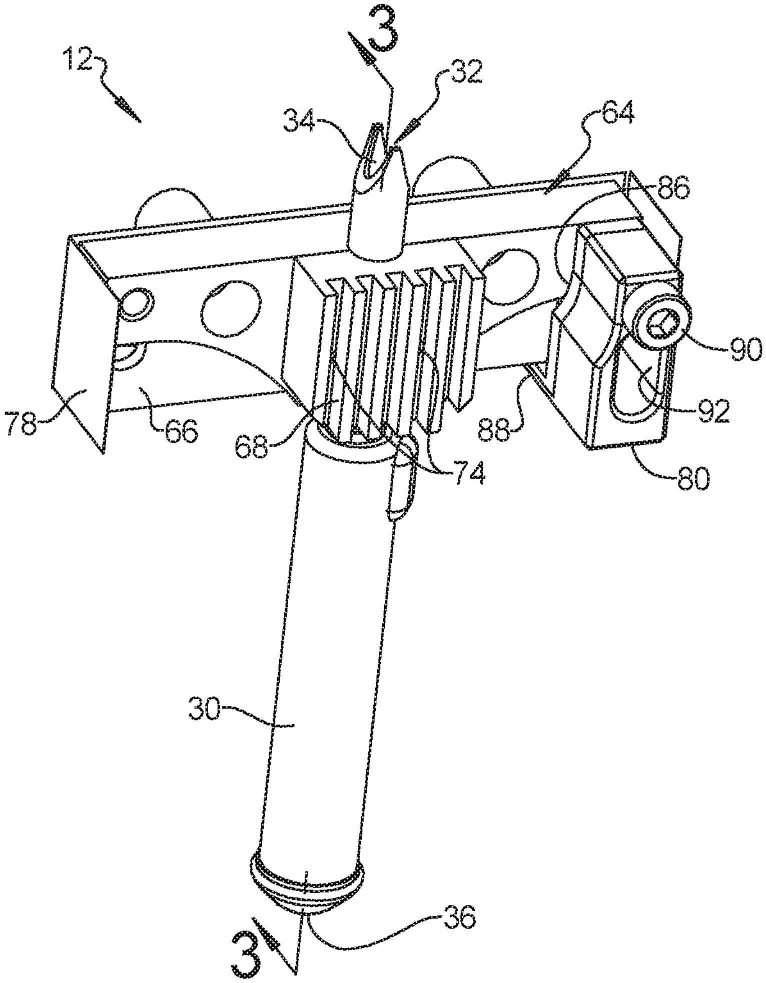
FIG. 2 a perspective view of an aspect of a print nozzle of the present disclosure.
Figure 3:
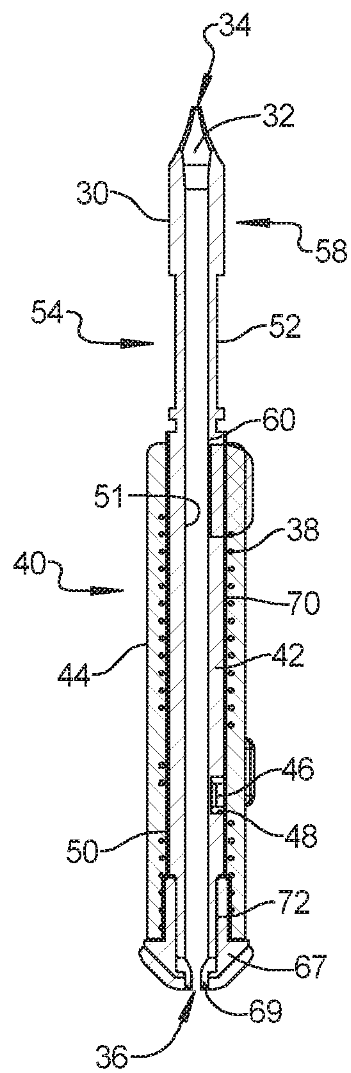
FIG. 3 a cross-sectional view of the barrel of FIG. 2.

FIG. 2 illustrates a print nozzle 12. In aspects, the print nozzle 12 includes a barrel 30. At least a portion of the barrel 30 is heated to melt the filament 22 (see FIG. 1) that passes through an opening 32 in the barrel 30. The opening 32 extends the length of the barrel 30, from the feed end 34 to the discharge end 36 (illustrated in FIG. 3). A cross-section of one aspect of the barrel 30 is illustrated in FIG. 3. The barrel 30 includes a heater coil 38 that is wrapped a number of times around a lower portion 40 of the barrel 30 barrel shank 42. Insulation 44 is provided around the barrel shank 42 and heater coil 38, which provides electrical insulation between the heater coil 38 and the barrel 30 and may include one or more layers of a ceramic, fiberglass or other material wrapped around, coated on, or otherwise deposited onto the heater coil 38 and barrel 30. Also provided is a temperature sensor 46, which may be mounted in a channel 48 formed in the surface 50 of the barrel shank 42, so that the temperature sensor 46 sits close to the inner wall 51 of the barrel 30 defining the opening 32. Thermal insulation may also be provided.

The barrel 30 further includes a neck 52 in the upper portion 54 of the barrel 30 having a reduced diameter as compared to the regions of the barrel 58, 60 above and below the neck 52. In aspects, the neck 52 may provide a heat break to reduce the transfer of heat from the lower portion 40 of the barrel 30 to the upper portion 54 of the barrel 30. In addition, the neck 52 may help secure the print nozzle 12 in the print nozzle clamp 64 (seen in FIG. 2) and, in particular, preventing movement of the barrel 30 in the z-direction relative to the nozzle clamp 64. The barrel 30 also includes an end cap 67, which retains an end tip 69 against the discharge end 36 of the barrel 30. The exterior surface 70 of the barrel 30 proximal to the discharge end 36 exhibits, in aspects, a reduced diameter region 72 as compared to the region 60 of the barrel 30 adjacent the reduced diameter region 72.

Turning again to FIG. 2, the nozzle clamp 64 includes a clamping frame 66 and a clamp plate 68, between which the barrel 30 is retained. The clamp plate 68 is affixed to the clamping frame 66 by one or more mechanical fasteners 74, such as screws, which engage the clamp plate 68 and clamping frame 66. In addition, the clamping frame 66 is affixed to the z-axis plate assembly 16 by one or more mechanical fasteners (not illustrated). In aspects, an isolation film 78 may be place around at least three sides of the clamping frame 66 to provide electrical insulation between the print nozzle and the z-axis plate 94. The isolation film 78 may be formed from, for example, a ceramic coating deposited on the clamping plate, a fiber glass sheet, an epoxy sheet, or a sheet of other insulating material. The print nozzle 12 also includes, in aspects, a cable clamp 80 for retaining wire leads 82, 84, illustrated in FIG. 1, electrically coupling the heater coil 38 and thermocouple 46 to the control system 1500 (see FIG. 15). A backing plate 86 may also be provided between the cable clamp 80 and the clamping frame 66. In further aspects, as illustrated, the backing plate 86 is "L" shaped, so as to provide a support shelf 88 for the wire leads 82, 84. In aspects, the cable clamp 80 and backing plate 86 is affixed to the clamping frame 66 by a mechanical fastener 90, which passes through a bore 92 in the cable clamp 80, backing plate 86, and clamping frame 66.

FIGS. **4*a* and 4*b* illustrate the print nozzle 12 mounted in the z-axis plate assembly 16. In the illustrated aspect, the z-axis plate assembly 16 includes a z-axis plate 94 that defines an opening 96 framed by opposing, first and second vertical side walls 98, 100 and opposing, first and second horizontal side walls 102, 104. The second, lower horizontal side wall 104 defines a recess 106 therein for receiving the print nozzle 12, wherein the print nozzle 12 is coupled to the recess 106 in the plate 94. The second, lower horizontal side wall 104 also includes one or more first upper travel limit stops 108, which may be adjusted in height to set a given distance of travel before the stop 108 impinges against a ledge 110 formed on the feed plate 112 as illustrated in FIG. 5. The first travel limit stop 108 is located in a bore 109 in the top of the second horizontal side wall 104. In aspects, the bore 109 includes internal threads that mate with threads provided on the first travel limit stop 108**. In further aspects, the given height is in the range of 0.1 to 1.5 mm, including all values and ranges therein.

With reference to FIG. **4*a* through 4*c*, the z-axis plate assembly 16 further includes first and second flexures 120, 122. The flexures 120, 122 are compliant members that affix the z-axis plate assembly 16 and feed plate 112, as seen in FIG. 5. In aspects, the flexures are formed from blue spring steel; however, other metals, metal alloys or polymer materials may be used. Material selection and thickness may be adjusted to tune for the desired amount of spring force. For example, in the case of blue spring steel, the flexures may exhibit a thickness in the range of 0.10 mm to 1.00 mm, including all values and ranges therein such as 0.25 mm. The flexures 120, 122 are affixed to the z-axis plate 94 and the feed plate 112 using blocks 124 (not all have been labeled for clarity) and mechanical fasteners 126 (again, a few have been labeled for clarity). The flexures 120, 122 are placed between the plates 94, 112 and the blocks 124 and the mechanical fasteners 126 affix the blocks 124 to the z-axis plate 94 and the feed plate 112**.

The flexures 120, 122 are illustrated as taking on a "C" shape, however, other configurations may be assumed. Further, in the illustrated aspect, the elongated arm 123 of the "C" shape flexures 120, 122 is affixed to the feed plate 112; however, alternative arrangements are also contemplated for each flexure 120, 122. While two flexures are illustrated extending between the z-axis plate assembly 16 and the feed plate 112, three or more flexures may be provided, such as in the range of three to eight flexures. In addition, while it is illustrated that each stabilization block is fastened by at least two mechanical fasteners, e.g., screws, to the feed plate 112 and at least three mechanical fasteners, e.g., screws, to the z-axis plate assembly 16, one or more, such as up to four mechanical fasteners may be used to tie the stabilization blocks 124 to the z-axis plate assembly 16 and the feed plate 112.

With reference again to FIG. 5, which illustrates a cross-section of the printer head 10, it is also noted that the upper, horizontal side wall 104 includes one or more lower limit travel stops 130, which may be adjusted in height to set a given distance of travel of the z-axis plate assembly 16 before the stop 130 impinges against a cross-bar 140 affixed to the feed plate 112 as illustrated in FIG. 6, which depicts the feed system 14. In aspects the given distance is in the range of 0.1 to 1.5 mm, including all values and ranges therein. The lower, second travel limit stop 130 is positioned in a bore 131 formed in the bottom of the first horizontal side wall 102. In aspects, the bore 131 includes internal threads that mate with threads provided on the second travel limit stop 130. As illustrated in FIG. 1, the cross-bar 140 is fixed in the opening 96 formed by the z-axis plate 94, wherein the z-axis plate 94 moves relative to the cross-bar 140 and the feed plate 112. The cross-bar 140 may be affixed using mating fasteners 142, such as a nut and bolt assembly, or via a screw which engages the feed plate 112.

A wire retainer 144 is mounted to a vertical, side wall 100 of the z-axis plate 94, as illustrated in FIG. 6. The wire retainer 144 may hold the various wire leads 82, 84 extending from the print nozzle 12. The wire retainer 144 defines a three-sided channel 146. The fourth side 148 defines a channel opening 150 to provide access to the channel 146. The channel opening 150 is curvate along the length of the channel 146, which assists in retaining wire leads 82, 84 within the channel 146.

Figure 7A:
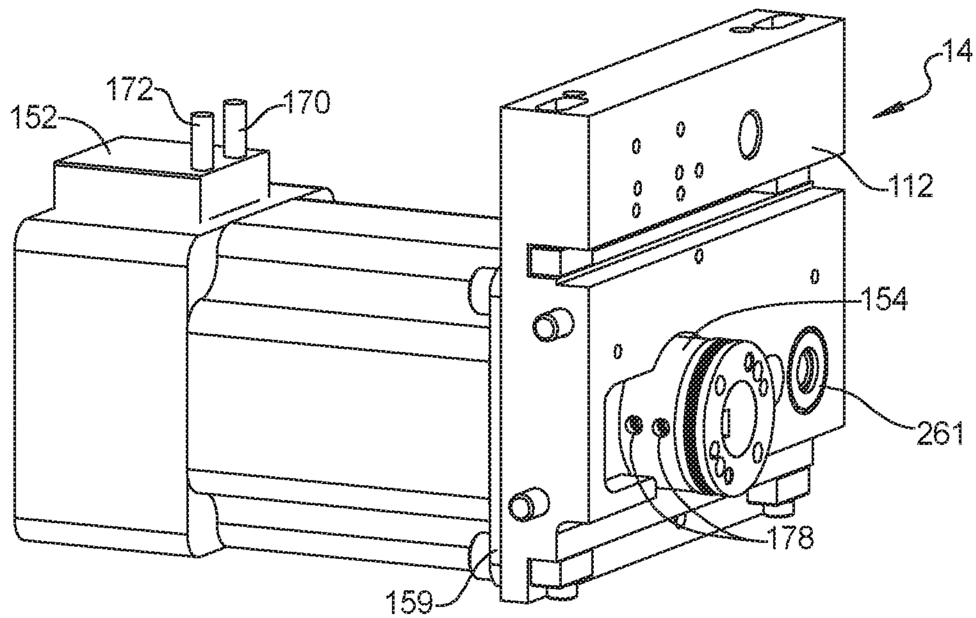

With reference to FIGS. **7*a* and 7*b* a feed system 14 is illustrated. The feed system 14 pulls filament 22 from a filament cart (not illustrated) or other filament supply source). The feed system 14 generally includes a drive motor 152, a feed hob 154 mounted to the drive motor 152, an idle assembly 156 mounted to the feed plate 112, and a receiver 158 also mounted to the feed plate 112. Turning now to FIG. 7*a*, in aspects, a support plate 159 is provided between the drive motor 152 and the feed plate 112. The support plate 159 may provide mechanical stabilization of the feed plate 112 the various components affixed thereto, including the feed hob 154, the idle assembly 156, the receiver 158, z-axis plate assembly 16, the print nozzle 12, and the sensor assembly 18** (described later herein).

The drive motor 152 includes a drive shaft 160 extending therefrom (illustrated in FIG. **7*b*), which is received in the feed hob 154. In aspects, the drive motor is a servo motor. The feed hob 154 is mounted to the drive shaft 160 in a non-rotatable manner relative to the drive shaft 160, such that the feed hob 154 rotates with the drive shaft 160. In aspects, the motor includes a number of sensors, including e.g., a current sensor (164 seen in FIG. 15), a torque sensor (166 seen in FIG. 15), or both a current sensor and a torque sensor for measuring the force applied by the feed hob 154 to the filament 22, and a rotary encoder (168 seen in FIG. 15) for measuring speed. In aspects, the torque sensor 166 is omitted. One or more wire leads 170 electrically couple the sensors to a control system 1500, illustrated in FIG. 15. Further, power is provided to the drive motor 152 via one or more wire leads 172, which in further aspects, may also be electrically coupled to the control system, illustrated in FIG. 15**.

The drive shaft 160 includes a groove 174 formed in the surface 176 of the drive shaft 160, which receives one or more locking features 178 of the feed hob 154. As illustrated, the locking feature is a pair of set screws 178, which extend through the feed hob 154 into the drive shaft 160 groove 174; however, in other embodiments, the locking feature 178 may be a tooth extending from the interior surface 180 (see e.g., FIG. 8*a*) of the feed hob 154, or a set of dowel pins which may also extend through the feed hob 154 into the drive shaft 160 groove 174.

Figure 8C:
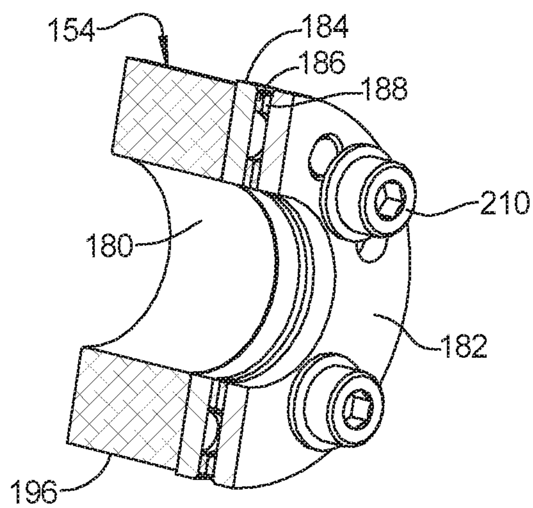

Reference is now made to FIGS. 8*a*, 8*b*, and 8*c*. The feed hob 154 includes a face plate 182, a back plate 184, drive teeth plates 186, 188, and a hob backing 190 for affixing the plates 182, 184, 186, 188 to the drive shaft 160. As alluded to above, through holes 192, 194 are provided in the hob backing 190, from the external surface 196 to the interior surface 180, in which the set screws 178 are inserted; the screws 178 engaging the hob backing 190 to the drive shaft 160. As illustrated, two drive teeth plate 186, 188 are provided, which engage the filament 22. While only two plates 186, 188 are illustrated, one to 4 drive teeth plates may be provided, depending on plate thickness and filament geometry. In particular aspects, the drive teeth plates 186, 188 include an odd number of teeth 198, which are formed into the periphery 200 of the drive teeth plates 186, 188. A number of drive teeth plates, in the range of 1 to 300 plates including all values and ranges therein, may be formed at the same time using e.g., wire electrical discharge machining (wire EDM). In particular aspects, a single pass of wire EDM is used to leave a relatively rough texture on the teeth 186, 188 for increased grip on the filament. If an odd number of teeth are formed, the teeth 198 may be offset by placing the plates 186, 188 back to back, assuming the plates are stacked front to back when machined. Stated another way, the plates may all be identical in shape and by flipping one plate relative to another the teeth may be set to alternate. In aspects, the drive teeth plates 186, 188 are 500 nm to 1 micrometer in size, including all values and ranges therein. The face plate 182, back plate 184, and drive teeth plates 186, 188 are located relative to each other and the hob backing 190 by dowel pins 206. The plates 182, 184, 186, 188 and the hob backing 190 are then secured using one or more mechanical fasteners 210, such as a nut and bolt assembly, which are inserted through bores 212 that extend through the feed hob 154 from the face plate 182 to the hob backing 190.

Figure 7B:
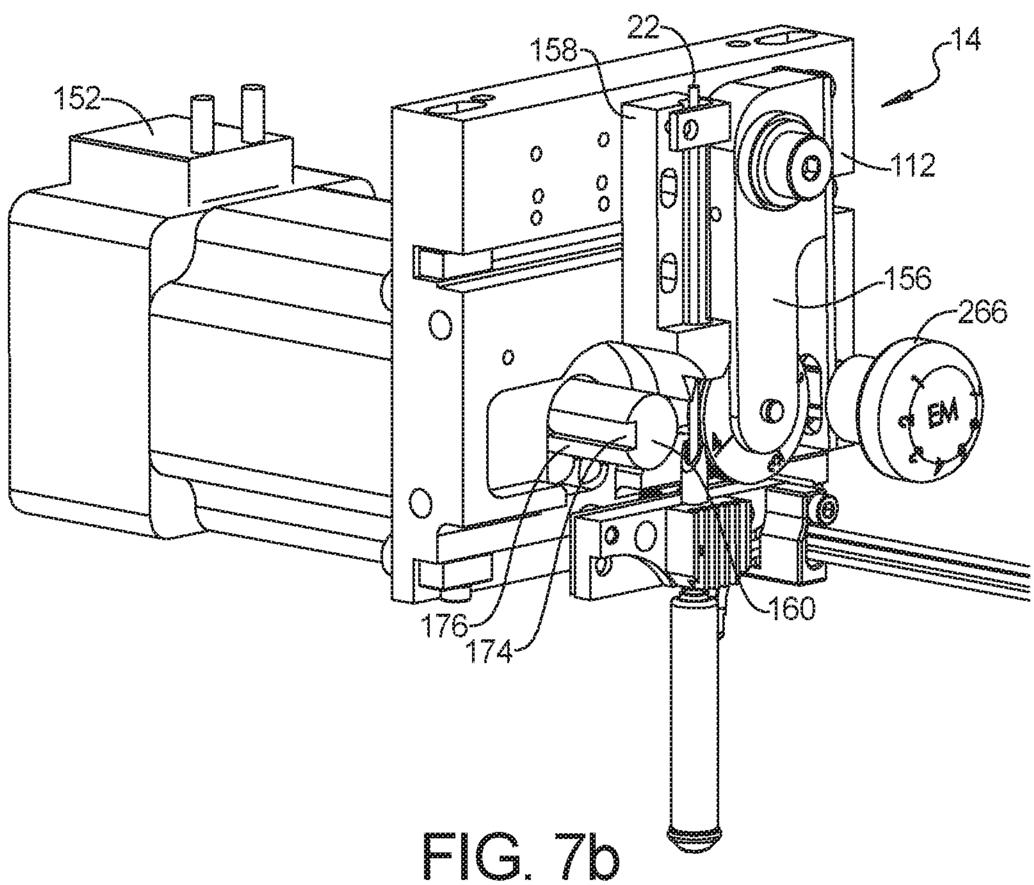
Figure 9B:
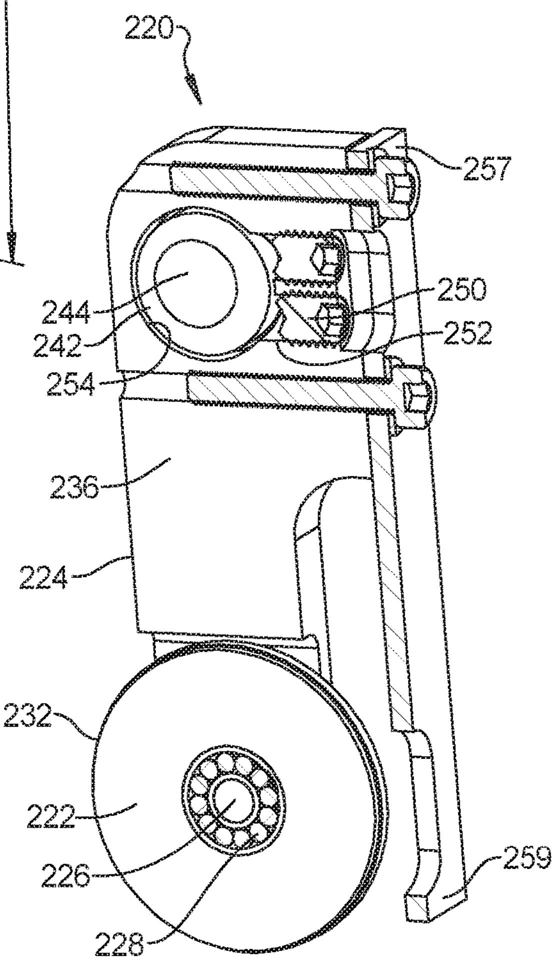

As illustrated in FIGS. 7*b* and 9*a* and 9*b*, the feed system 14 further includes an idle assembly 156. The idle assembly 156 helps to guide the filament 22 against the feed hob 154 and into the barrel 30 of the print nozzle 12. The idle assembly 156 includes an idle hob 222, which is suspended in the idle arm body 224 on a spindle 226, such that the idle hob 222 rotates around the spindle 226. In an aspect, a bearing 228 is placed on the spindle 226 and the idle hob 222 rides on the bearing 228. The bearing 228 includes, in one aspect, a ball bearing; however, alternative bearings may be employed. The idle hob 222 includes defines a channel 230 in the perimeter 232 of the idle hob 222, which may generally accommodate the geometry of many of the filaments 22 used in the printer head 10. Stated another way, the width of the channel 230 may the same size or larger than the thickness of many of the filaments 22 used in the printer head 10; however, it may be appreciated that in some instances, the filaments 22 may be larger than the channel 230. The spindle 226 is mounted in two projections 234, 236 defining a groove 238 in the idle arm body 224 proximal to a first end 240 of the idle arm body 224.

The idle arm body 224 and eccentric cam 242 rotate around a pivot, in this case a screw 244, proximal to a second end 246, which opposes the first end 240. As the idle arm body 224 rotates around the pivot 244, the idle arm body 224 moves up and down, which moves the idle hob 222 up and down. This movement of the idle hob 222 up and down steers the filament 22 left or right. The ability to steer the filament 22 left or right assists in reducing drag caused by the filament 22 hitting the inner wall 50 of the barrel 30 at the feed end 34. Factors that may affect drag of the filament 22 include, e.g., filament 22 thickness, durometer, and flexural characteristics. A pair of set screws 250 is provided in bores 252 that extend into the idle arm body 224 through to the cam opening 254. The set screws 250 abut the eccentric cam 242.

A leaf spring 256 is affixed at a first end 257 to the idle arm 204 proximal to the second end 246 of the idle arm 204. In aspects, the leaf spring 256 is affixed using one or more mechanical fasteners. The leaf spring 256 extends down to the idle hob 222 and, in particular aspects, may exhibit a length Ls that is as long as or longer than the length Li of the idle arm body 224. As illustrated in FIG. 10, the leaf spring 256 is biased at a second end 259 against a second eccentric cam 260. The second eccentric cam 260 rotates around a pivot point, in this example, a screw 262. The second cam 260 includes a number of detents 264, which contact the leaf spring 256, wherein the size of the detents 264 vary around the perimeter of the cam. In aspects, an adjustment knob 266, illustrated in FIG. 7*b*, is used to adjust the bias applied to the leaf spring 256 by the second eccentric cam 260, wherein larger detents 264 apply a greater bias against the leaf spring 256. The adjustment knob 266 is mounted on the retention brackets 268, which extend from the second eccentric cam 260. With reference to FIG. 11, the retention brackets 268 are received in a hub 270 extending from the back 272 of the knob 266 and are biased against the internal wall 274 of the hub 270. Further, the retention brackets 268 include a mechanical feature that interlocks with the internal wall 274 of the hub 270. For example, one or both retention brackets 268 may include teeth that engage one or more grooves defined in the internal wall 274 of the hub 270.

A third eccentric cam 261 (illustrated in FIG. 7*a*) is optionally provided under the second eccentric cam 260. The third eccentric cam 261 is provided to set the zero point for the second eccentric cam 260. The third eccentric cam 261 rotates around the pivot 262. The second eccentric cam 260 will be set up with the third eccentric cam 261 to a known offset. Use of the third eccentric cam 261 may allow for an improvement in consistency of the force applied to leaf spring 256 from printer head 10 to printer head 10.

Figure 12C:
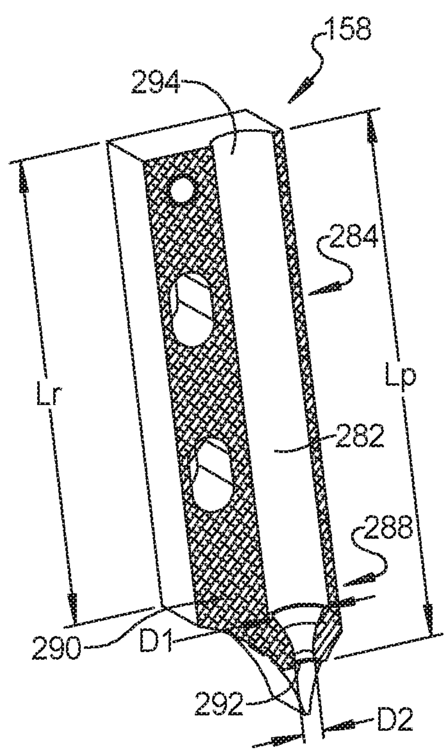

As noted above and illustrated further in FIGS. 12*a* through 12*c*, a receiver 158 is also provided in the feed system 14. The receiver 158 is an elongate member that guides the filament 22 between the feed hob 154 and the idle assembly 156, which may assist in preventing the filament 22 from rubbing against or becoming entangled in the feed hob 154 and the idle assembly 156. Turning now to FIGS. 12*a* and 12*c*, the receiver 158 defines a feed pathway 282. In a first portion 284, the feed pathway 282 is partially open and is defined in a first wall 286 of the receiver 158. In this portion of the receiver 158, the feed pathway 282 assumes the configuration of a semi-cylinder (a cylinder cut in half longitudinally). In a second portion 288 which adjoins the first portion 284, the pathway 282 is defined in a tapered block 290 and assumes the shape of a cylinder.

Within the tapered block 290, the diameter of the feed pathway 282 is reduced from a first diameter D1 to a second diameter D2 at or proximal to the pathway exit 292. The diameter of the feed pathway 282 in the first portion 284 of the receiver 158, in aspects, is the same as the first diameter D1 of the feed pathway 282 in the second portion 288. At the transition between the first portion 284 and the second portion 288, the tapered block 290 exhibits a first width W1 and approaching the pathway exit 162, the tapered block 290 exhibits a second width W2 that is less than the first width W1. The tapered block 290 may extend down past the pathway exit 292, such that the entire length of the receiver Lr is greater than the length of the pathway Lp.

At the pathway inlet 290, the receiver 158 includes a guard 296 that extends out from the first wall 286 and across the pathway 282. An opening 298 is defined between the guard 296 and the first wall 286 to assist feeding of the filament 22 into the pathway 282. Further, the portion of the feed pathway 282 defined by the guard 296 is cylindrical, or nearly cylindrical in shape, with the exception of the opening 298. The guard 296 may prevent movement of the filament 22 away from the receiver 280 towards the z-axis plate 94 and cross-bar 140.

Figure 13B:
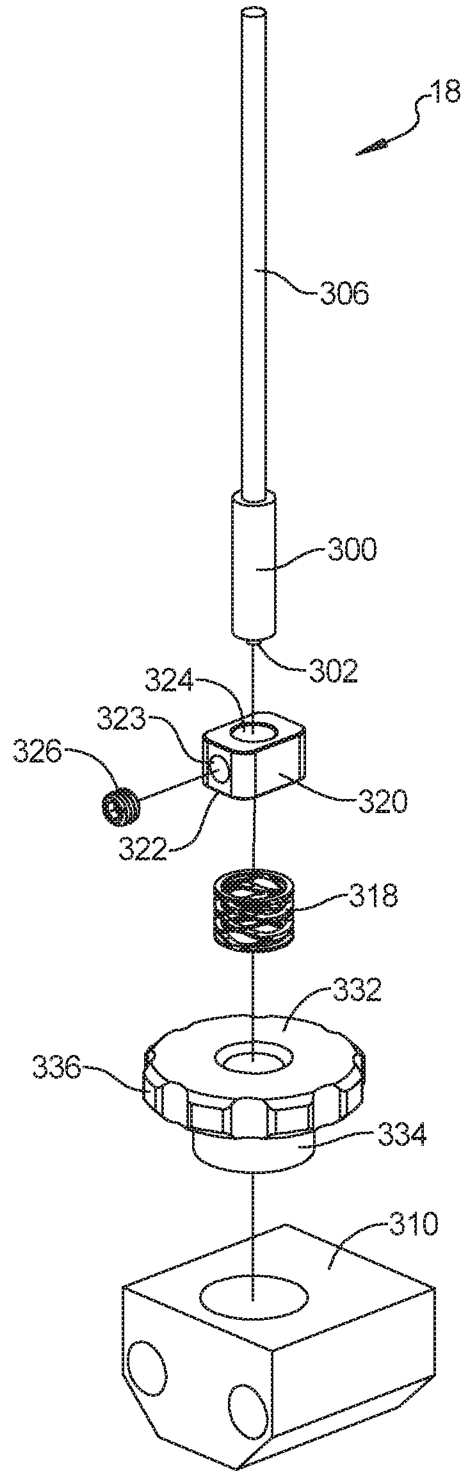

The printer head 10 may also include one or more sensors that determine the height of the z-axis plate 94 relative to the feed plate 112. FIG. 1, with further reference to FIGS. 13*a* and 13*b*, illustrates an aspect of a sensor assembly 18 including an electromechanical on/off position sensor 300, in this case a push button switch or a limit switch, wherein the switch is triggered by the z-axis plate assembly 16 contacting and activating the switch 302. In addition to a electromechanical on/off position sensor 300, or alternatively to a electromechanical position sensor 300, other linear position sensors, such as magnetic sensors or optical switches, may be used that continuously track the position of the z-axis plate 94 relative to the feed plate 112. Such sensors may include linear encoders, linear variable differential transformers, Hall Effect sensors, inductive sensors, piezo-electric transducers, etc. In particular aspects, a continuous position sensor 304 (seen in FIG. 1) is used in combination with the electromechanical position sensor 300. The electromechanical position sensor 300 includes a wire lead 306 that electrically couples the electromechanical position sensor 300 to the control system 1500, see FIG. 15.

As illustrated, the sensor assembly 18 includes further a sensor bracket 310 that is coupled to the feed plate 112; however, it may be appreciated that in some variations of deployment, the sensor bracket 310 is coupled to the z-axis plate 94. The sensor bracket 310 includes an opening 312 defined therein through which the electromechanical position sensor 300 passes. At the bottom end 314 of the opening 312, a ledge 316 is present extending into the opening 312. On the ledge 316, a spring 318 is placed around the electromechanical position sensor 300. A retention block 320 rides upon the spring 318 and, in particular aspects, the spring 318 is inserted into a channel in the base 322 of the retention block 320, is coupled to the spring 318, or both.

The electromechanical position sensor 300 is inserted through a bore 324 in the retention block 320. The retention block 320 is secured to the sensor using a mechanical fastener 326 that engages both the electromechanical position sensor 300 and the retention block 320. In aspects, the mechanical fastener 326 is a set screw that includes threads that mate with the threads (not illustrated) in a bore 323 in the retention block 320 and applies a force against the electromechanical position sensor 300. In further aspects, the mechanical fastener 326 is fully received in the retention block 320, i.e., it does not protrude from the retention block 320, so that the retention block may ride freely within the opening 312 between the ledge 316 and the opposing, top end 202 of the opening.

Further, an adjustment knob 332 is engaged in the opening 312, such as by an interference fit of the base 334 of the adjustment knob 332 with the opening 312 or engaged in the opening 312 by mating threads located on the base 334 of the adjustment knob 332. The base 334 of the adjustment knob 332 abuts the retention block 320 and biases the retention block 320 and spring 318 against the ledge 316. By moving the adjustment knob 332 up and down, the position of the retention block 320 and sensor 300 relative to the z-axis plate 94 can be adjusted up or down. As illustrated, the adjustment knob 332 includes a grip portion 336 that, in the illustrated aspect, exhibits an outer diameter that is larger than the outer diameter of the base 334 and the end 314 of the opening 312. However, the adjustment knob 332 may alternatively exhibit a grip portion 336 that is the same as or smaller than the base 334 of the adjustment knob 332. In addition, while the adjustment knob grip portion 336 is illustrated as being generally cylindrical in shape, the adjustment knob grip portion 336 may exhibit other configurations, including polyhedron prism shapes, such as that of a hexagonal prism, an octagonal prism, etc.

It may be appreciated that as in the aspect illustrated the diameter of the opening 312 changes along the length of the opening 312, wherein the diameter of the opening 312 changes from the top end 330 to the bottom end 314. A first portion 338 of the opening 312 proximal to and at the top end 330 is larger in diameter and transitions to a smaller diameter in a second portion 342 of the opening 312 proximal to or at the middle of the length of the opening and further transitions to yet a smaller diameter in a third portion 344 of the opening 312 defined by the ledge 316. In the transition region 340, the opening is frusto-conical in shape. However it may be appreciated, that alternatively, the opening 312 may exhibit the same diameter through the first and second portions 338, 342, or even exhibit the same diameter along the entire length of the opening through the first, second and third portions 338, 342 and 344.

In aspects, as illustrated in FIG. 14, a force sensor 350 is placed on horizontal side wall 98 of the z-axis plate 94 or in the cross-bar 140 and arranged such that it measures the force between the cross-bar 140 and the z-axis plate 94. For example, as illustrated, the force sensor 350 may be placed within a pocket 352 in the horizontal side wall 98; it may also be placed on the underside of the horizontal side wall 98. In further aspects, the force sensor 350 is, e.g., a strain gauge, such as a button force sensor, or a capacitance sensor.

FIG. 15 illustrates a control system 1500 for controlling the printer head and automatic touch down apparatus 1502. The control system 1500 includes one or more processors 1504, which is coupled to the various components 1506, 1508, 1510 of the printer head and automatic touchdown apparatus 1502 through one or more communications links 1506, such as a bus, electrical wire leads, or one or more wireless components (Wi-Fi, Bluetooth, etc). Where more than one processor is present, the processors 1504 perform distributed or parallel processing protocols and the processors 1504 may include, for example, application specific integrated circuits, a programmable gate array include a field programmable gate array, a graphics processing unit, a physics processing unit, a digital-signal processor, or a front-end processor. The processors 1504 are understood to be preprogrammed to execute code or instructions to perform, for example, operations, acts, tasks, functions, or steps coordinating with other devices and components to perform operations when needed.

As alluded to above, the drive motor 152, current sensor 1512, torque sensor 1514 and rotary encoder 168 are all electrically coupled, or alternatively may be wirelessly coupled, to the control system 1500. In addition, the sensors, including the electromechanical on/off position sensor 300, continuous position sensor 304, and force sensor 350, associated with the feed system 14 and the z-axis plate assembly 16 are also electrically coupled, or alternatively may be wirelessly coupled, to the control system 1500. Further, the thermocouple 46 and heater coil 38 of the print nozzle 12 are also coupled to the control system 1500. In addition, a continuous position sensor 1518 associated with the support table and a step motor 1520 associated with the support table and moving the support table 20 up and down through the z-axis relative to the feed plate 112, such as a drive motor or a stepper motor.

In a method of aligning the printer head 10 with the support table 20, the support table 20 is raised relative to the printer head 10 using the motor 1520. The discharge end 36 of the print nozzle 12 may contact the support table 20, causing the z-axis plate 94 to rise and trigger the electromechanical sensor 300, which may stop the support table 20 from rising further. When this occurs, the control system 1500 identifies that the support table has contacted the print nozzle. In addition, the control system 1500 identifies the location of the support table 20 relative to print nozzle 12 on the z-axis using signals received from sensor 1518 representing the location of the support table 20 on the z-axis. This process may be repeated at various motor speeds of the support table 20 motor 1520, slower motor speeds of the support table 20 motor 1520 may provide relatively higher degrees of accuracy. Thus, the method may be performed at a first speed and repeated at a second, slower speed that is less than the first speed, and repeated again, etc.

Further, this process may be repeated in at least three different x,y locations (e.g., x1,y1; x2,yx; and x3,y3) across the support surface to map a plane and level the support table 20 relative to the print nozzle 12, the print nozzle 12 illustrated as being located in a first position. In addition, at each x,y location the first speed at which the support table 20 is raised may be the same or different from the first speeds used at other x,y locations. In addition, the second speed for each x,y location may be the same or different. In particular aspects, the second speed for each x,y location is less than the first speed used at the x,y location regardless.

It is also noted that sensors 300, 304, 350, may assist in identifying locations where there are errors or anomalies in the deposited filament 22, such as where excess or insufficient filament 22 has been deposited. Where an excess of deposited filament 22 may be present, the z-axis plate assembly 16 may rise unexpectedly, which can be detected by the continuous position sensor 304 and electromechanical position sensor 300. Further, where less than expected filament 22 may be present, the z-axis plate assembly 16 may drop unexpectedly, which can also be detected by the continuous position sensor 304. Further, the control system 1500 may account for these anomalies and correct for them by depositing more or less material in the next layer at the location the anomaly was detected.

Further, in various aspects, the sensors are utilized to measure melt flow and viscosity. In aspects, the drive motor 152 is programmed to feed the filament 22 at a given feed rate, e.g., millimeters per second. Further, a rotary encoder 168 may be provided to measure the feed hob 154 speed. The force to feed the filament 22 at that rate may be determined from the torque applied by the motor on the feed hob 154 (assuming no slip relative to the filament 22). Torque may be determined directly, or using a correlation based on the current supplied to the drive motor 152.

For example, without being bound to these particular numbers, if the motor supplies 2 Nm of force per Amp and 2 Amps are being supplied to the motor 4 Nm of force is being applied. This measurement is then divided by the radius of the drive teeth plates 186, 188 to arrive at the force applied to the filament 22. In addition, the geometry of the barrel 30 and end tip 69 may be taken into account. From this measurement, shear viscosity, i.e., the resistance to shear flow, may be determined, given that shear stress (the force over the area) and shear strain rate (displacement/time) are known. Further, temperature is known as the thermocouple 46 measures the barrel 30 temperature. Accordingly, melt flow profiles may be developed by the printer for a given filament material based upon the above mentioned measurements and adjusting barrel temperature and feed rate of the filament.

Without being bound to any particular theory, as would be understood by a person having ordinary skill in the art, for many thermoplastic polymer materials or partially thermoplastic co-polymers (including some amount of cross-linking in the polymer chain), as temperature increases in the barrel and the polymer temperature increases, the viscosity may decrease, at least up to a point where the material begins to thermally degrade. In addition, increases in the force applied to the filament or the rate at which force is applied to the filament may decrease viscosity, known as sheer thinning, up to the point where the filament is passing through the barrel to quickly to melt.

The combination of heat and force applied to the filament allows the filament 22 to flow through the print nozzle 12 and be deposited on the support table 20. However, drag on the filament 22 through the opening 32 of the barrel 30 and forces acting on the filament as it is pulled from the filament supply source, which may, e.g., cause the filament to retract, may affect the force determination made above. Accordingly, force detected at the force sensor 350 may be used to alter or adjust the force measurement determined above.

A method of depositing filament to form a three-dimensional component using the above described printer head 10 is also disclosed herein. The filament 22 is engaged by the drive teeth 198 of the feed hob 154; being biased against the feed hob 154 by the idle assembly 156. The drive motor 10 rotates the feed hob 154 and pulls the filament 22 down into the print nozzle 12 barrel 30. In the barrel, the filament 22 is heated at a temperature sufficient to reduce the viscosity of the filament 22. Due to the force applied to the filament 22 by the feed hob 154, the filament 22 may further undergo shear thinning, further reducing the viscosity. In aspects, the rate at which the filament 22 is fed into the print nozzle 12 is determined by the control system 1500, which also measures the actual filament feed rate and adjusts motor current and torque to achieve the desired feed rate.

The filament 22 exits the print nozzle 12 and is deposited in a plurality of sequential layers on the support table 20, each layer at least partially solidifying prior to the deposition of the next layer until a three-dimensional component is formed. Further, in aspects of the above, the filament 22 is pulled through a receiver 158 prior to being engaged by the drive teeth 198 of the feed hob 154. The receiver 158 prevents the filament 22 from getting otherwise entangled in the feed hob 154 or idle assembly 156 and places the filament 22 in a better position to be received by the feed hob 154 and idle assembly 156.

A printer head of the present disclosure offers several advantages. These include the ability of the z-axis plate assembly 16 to move relative to drive motor 152, the feed hob 154, the idle assembly 156, and the receiver 158 in the z-axis, i.e., up and down. These further include the ability to protect the nozzle by allowing the nozzle assembly to flex when the nozzle interacts with the support table or a component being formed by the system. These further include the ability to monitor motor operation, displacement of the print nozzle relative to the feed plate, and flow characteristics of the filament.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A three-dimensional printer head, comprising:

a drive motor including a drive shaft;

a feed plate affixed to the drive motor;

a feed hob mounted to the drive shaft, wherein the feed hob includes drive teeth configured to engage a filament;

an idle assembly mounted to the feed plate configured to bias the filament against the drive teeth;

a z-axis plate assembly, wherein the z-axis plate assembly includes at least two flexures coupling a z-axis plate to the feed plate;

a print nozzle mounted to the z-axis plate assembly; and a sensor coupled to the feed plate, wherein the sensor is at least one of a contact sensor or a non-contact sensor and the sensor is configured to be triggered by the z-axis plate assembly when the z-axis plate assembly moves a given distance in a first direction.

2. The three-dimensional printer head of claim 1, wherein the print nozzle includes a barrel, a heater coil wrapped around the barrel, insulation covering the heater coil, and a nozzle clamp coupling the barrel to the z-axis plate assembly.

3. The three-dimensional printer head of claim 1, wherein the z-axis plate defines an opening framed by opening first and second vertical side walls and first and second horizontal side walls, wherein the second horizontal side wall defines a recess and the print nozzle is coupled to the z-axis plate in the recess.

4. The three-dimensional printer head of claim 1, wherein the at least two flexures are coupled to the z-axis plate and the feed plate with blocks, wherein the at least two flexures are positioned between the blocks and the z-axis plate or feed plate, and mechanical fasteners affix the blocks to the z-axis plate and or feed plate.

5. The three-dimensional printer head of claim 3, wherein the feed plate includes a ledge and the second horizontal side wall includes a first travel limit stop, configured to impinge on the ledge when the z-axis plate assembly moves up a given distance.

6. The three-dimensional printer head of claim 3, further including a cross-bar coupled to the feed plate, extending into the opening of the z-axis plate.

7. The three-dimensional printer head of claim 6, further comprising a second sensor mounted to the cross-bar and configured to provide electrical signals to a control system indicating a force of the z-axis plate on the cross-bar.

8. The three-dimensional printer head of claim 6, wherein the z-axis plate assembly includes a second travel limit stop configured to impinge on the cross-bar when the z-axis plate assembly moves down a given distance.

9. The three-dimensional printer head of claim 1, wherein the feed hob includes drive teeth plates configured to engage a filament.

10. The three-dimensional printer head of claim 1, wherein the idle assembly including an idle hob configured to bias a filament against the feed hob.

11. The three-dimensional printer head of claim 10, wherein the idle hob is mounted on an idle arm body, which is mounted on a first eccentric cam that rotates around a pivot.

12. The three-dimensional printer head of claim 11, wherein the idle arm body is coupled to a leaf spring at a first end of the leaf spring and the leaf spring is biased at a second end of the leaf spring with a second eccentric cam.

13. The three-dimensional printer head of claim 12, wherein an adjustment knob is coupled to the second eccentric cam.

14. The three-dimensional printer head of claim 1, further including a receiver connected to the feed plate, wherein the receiver includes a pathway configured to guide the filament between the feed hob and the idle assembly.

15. The three-dimensional printer head of claim 1, wherein a wire retainer is mounted to the z-axis plate assembly.

16. The three-dimensional printer head of claim 1, further comprising a third sensor mounted to one of the feed plate and the z-axis plate, and the third sensor is configured to provide electrical signals to a control system indicating a location of the z-axis plate relative to the feed plate.

17. A method of locating a three-dimensional printer head relative to a support table, comprising:

raising a support table relative to a printer head including a print nozzle at a first speed, wherein the printer head includes a drive motor including a drive shaft, a feed plate affixed to the drive motor, a feed hob mounted to the drive shaft, wherein the feed hob includes drive teeth, an idle assembly mounted to the feed plate, a z-axis plate assembly including at least two flexures coupling a z-axis plate to the feed plate, the print nozzle mounted to the z-axis plate assembly, and a sensor coupled to the feed plate wherein the sensor is configured to be triggered by the z-axis plate assembly when the z-axis plate assembly moves a given distance in a first direction; and triggering the sensor, wherein triggering of the sensor indicates to a control system that the support table has contacted the print nozzle.

18. The method of claim 17, further comprising repeating raising the support table relative to the printer head at least once at a second speed that is less than the first speed; and triggering the sensor.

19. The method of claim 17, wherein the printer head is located at a first x,y location relative to the support table and the method further comprises moving the printer head to a second x,y location relative to the support table and repeating the steps of raising the support table relative to the printer head and triggering the sensor; and moving the printer head to a third x,y location relative to the support table and repeating the steps of raising the support table relative to the printer head and triggering the sensor.

20. The method of claim 17, further comprising repeating raising the support table relative to the printer head at each x,y location at least once at a second speed that is less than the first speed and triggering the sensor.

* * * * *